(No Model.)
T. FELL.
CORN PLANTING MACHINE.
No. 248,298. Patented Oct. 18, 1881.
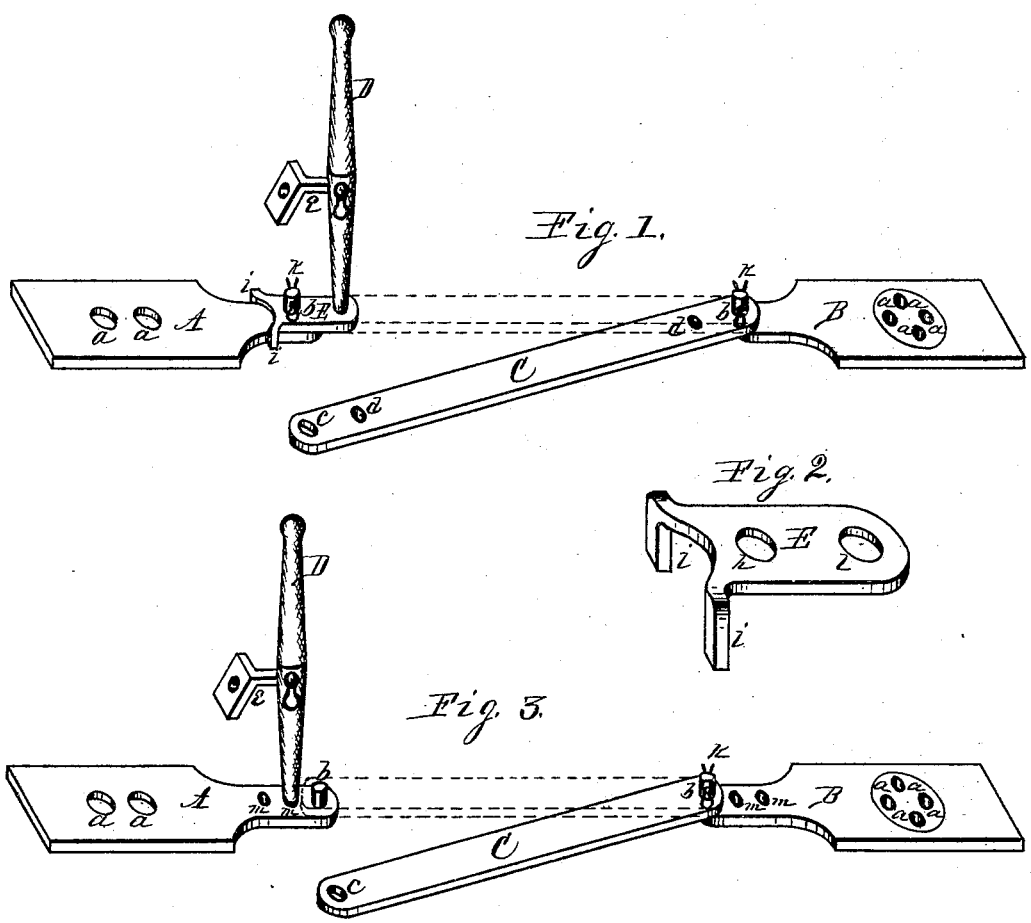
Witnesses.
Israel Sovereign
A. O. Behel.
Inventor.
Thomas Fell.
Per Jacob Behel.
Atty

UNITED STATES PATENT OFFICE.

THOMAS FELL, OF BURRITT, ASSIGNOR TO EMERSON, TALCOTT & CO., OF ROCKFORD, ILLINOIS.

CORN-PLANTING MACHINE.

SPECIFICATION forming part of Letters Patent No. 248,298, dated October 18, 1881.

Application filed June 15, 1881. (No model.)

*To all whom it may concern:*

Be it known that I, THOMAS FELL, a citizen of the United States, residing in the town of Burritt, in the county of Winnebago and State of Illinois, have invented a new and useful Improvement in Corn-Planting Machines, of which the following is a specification.

My invention relates to improvements in that class of corn-planters known as "horse or power planters," designed to plant two rows at the same time; but my invention relates more particularly to the movements of the slides or other mechanism employed in such machines for the distribution of the seed; and it consists in means by which the seed-distributing mechanism on the opposite sides of the machine as usually connected to be operated in unison to plant two rows may be readily disconnected in such a manner that the seeding mechanism on either side of the machine may be operated independent of the opposite side to adapt the machine to plant a single row without removing the seed from the opposite seed-box. To this end I have designed, constructed, and applied the devices represented in the accompanying drawings, in which—

Figure 1 is an isometrical representation of portions of a corn-planting machine embodying my invention in a form capable of use on some forms of machines now in use. Fig. 2 represents the supplemental portion employed in the form of my invention, as represented in Fig. 1. Fig. 3 is an isometrical representation of my improvement in which the supplemental portion is omitted.

In the figures, at A and B, are represented different forms of seed-distributing slides, having suitable seed-cells, a, formed therein, and are substantially such slides as are in use in some forms of corn or seed planting machines. These seed-slides are usually placed in the bottom of the seed-receptacles in such a manner as to be capable of an endwise sliding or other equivalent movement, and operate to distribute the seed contained therein. These slides are usually connected by means of a suitable bar, substantially such as represented at C, having its end portions connected with the inner end portions of the slides in any suitable manner. In this instance the inner end portion of the seed-slides are provided with an uprising stud, as represented at $b$, which are fitted to enter a hole, $c$, in the end of the connecting-bar, operating to give to the slides a fixed position relatively with each other, and when moved in the lengthwise direction of the connecting-bar will cause them to move in unison, and will plant two rows at the same time. The end portions of this connecting-bar are provided with a hole or holes, $d$, to receive the lower end of a suitable hand-lever, D, pivoted on a suitable fulcrum-support, as at $e$, and employed to impart a reciprocating movement to the slides. These parts are substantially the same as like parts found in some varieties of seed-planting machines now in use or found in the trade, and are operated in the same manner for the same purpose, and plant two rows at the same time. In this instance the connecting-bar is fixed in position to the seed-slides by means of a cotter, $k$, passed through a hole in the uprising studs $b$ immediately above the connecting-bar, in such a manner that when the cotter is removed the connecting-bar may be readily removed from the stud, as represented in the solid lines.

At E is represented a supplemental attachment, consisting of the bar E, fitted with a hole, $h$, to receive the uprising stud $b$ of the slide, and is fitted with a forked end having depending arms $i$, adapted to embrace the outer edges of the projecting end of the slide, and by means of the cotter $k$ or other suitable key passed through the stud is fixed in position thereon. The free end portion of this supplemental bar is fitted with a hole, $l$, adapted to receive the lower end of the hand-lever in the same manner that it is received by the hole $d$ in the connecting-bar. This supplemental bar, as will readily be seen, is capable of use on either slide, and by disconnecting either end of the connecting-bar and fixing the supplemental bar in place on the slide, either slide or the slide on either side of the machine may be operated independently to plant a single row with the slide on either side of the machine without removing the seed from the seed-box on the opposite side of the machine. This form of my improvement is capable of use on perhaps most of the forms of planting-machines now in common use; but some slight changes in the form or size of the supplemental bar may be required to adapt it to the particular make of machines for which it is designed, all of which is within the skill of the mechanic as such without the exercise of the inventive faculty.

In the form of my invention as represented in Fig. 3 I have lengthened the inward projecting end portion of the slides, and have provided them on the outside of the uprising stud $b$, on their inner ends, with a hole, $m$, fitted to receive the lower end of the hand-lever in the same manner that it is received in the hole $d$ in the connecting-bar, or in the hole $h$ in the supplemental bar E, in the form hereinbefore described. In this form, as shown in Fig. 3, I have dispensed with the supplemental bar, and in order to operate either slide independent of the other it is only necessary to disengage the connecting-bar from the slide to be operated independently, as represented in the solid lines.

By these methods of construction or their equivalents I am enabled to produce machines and also to fit machines already produced to be capable of independent use for the purpose of planting a single row or to employ but one side of the machine as a planter when desired.

I claim as my invention—

The combination, with two seed-slides, A B, detachable connecting-rod C, and lever D, of the supplemental bar or plate E, constructed and adapted to be secured to either one of the slides, and to have the lever D engaged therewith, substantially as set forth.

THOMAS FELL.

Witnesses:
A. O. BEHEL,
JACOB BEHEL.